US009499040B2

(12) United States Patent
Roos et al.

(10) Patent No.: US 9,499,040 B2
(45) Date of Patent: Nov. 22, 2016

(54) METHOD AND APPARATUS FOR MANAGING CHARGE DEPLETION IN A PLUG-IN HYBRID VEHICLE

(71) Applicant: GM GLOBAL TECHNOLOGY OPERATIONS LLC, Detriot, MI (US)

(72) Inventors: Bryan N. Roos, West Bloomfield, MI (US); Lan Wang, Troy, MI (US); Wei D. Wang, Troy, MI (US)

(73) Assignee: GM GLOBAL TECHNOLOGY OPERATIONS LLC, Detriot, MI (US)

( * ) Notice: Subject to any disclaimer, the term of this patent is extended or adjusted under 35 U.S.C. 154(b) by 100 days.

(21) Appl. No.: 13/714,723

(22) Filed: Dec. 14, 2012

(65) Prior Publication Data

US 2014/0172206 A1    Jun. 19, 2014

(51) Int. Cl.
| | |
|---|---|
| B60W 20/00 | (2016.01) |
| B60K 6/442 | (2007.10) |
| B60W 50/08 | (2012.01) |
| B60W 10/06 | (2006.01) |
| B60W 10/08 | (2006.01) |
| B60W 10/26 | (2006.01) |

(52) U.S. Cl.
CPC ............ *B60K 6/442* (2013.01); *B60W 10/06* (2013.01); *B60W 10/08* (2013.01); *B60W 10/26* (2013.01); *B60W 20/10* (2013.01); *B60W 50/082* (2013.01); *B60W 2540/04* (2013.01); *B60W 2710/244* (2013.01); *Y02T 10/6234* (2013.01); *Y02T 10/6286* (2013.01); *Y02T 90/14* (2013.01); *Y10S 903/903* (2013.01)

(58) Field of Classification Search
CPC .............. B60W 10/06; B60W 10/08; B60W 10/26; H01M 10/441
USPC ........................................... 701/22
See application file for complete search history.

(56) References Cited

U.S. PATENT DOCUMENTS

| | | | | |
|---|---|---|---|---|
| 6,362,602 | B1 * | 3/2002 | Kozarekar | 320/160 |
| 2009/0133733 | A1 * | 5/2009 | Retti | 136/206 |
| 2009/0248228 | A1 * | 10/2009 | Miller | 701/22 |
| 2010/0280687 | A1 * | 11/2010 | Tate, Jr. | B60W 10/06 701/22 |
| 2011/0166733 | A1 * | 7/2011 | Yu et al. | 701/22 |

OTHER PUBLICATIONS

Blanco, S.; 2014 Honda Accord Plug-In Hybrid; AOL Autoblog; Oct. 3, 2012; USA.

* cited by examiner

*Primary Examiner* — Todd Melton
*Assistant Examiner* — Jason Roberson

(57) ABSTRACT

A plug-in hybrid vehicle includes a hybrid powertrain system and an energy storage device. A method for operating the hybrid powertrain system includes initially operating the hybrid powertrain system in a charge-depletion mode to reduce a state-of-charge (SOC) of an energy storage device. In response to an operator request, the hybrid powertrain system operates in an opportunity charging mode to opportunistically charge the energy storage device to increase the SOC of the energy storage device during a trip prior to achieving a minimum SOC that is associated with triggering operation in a charge sustaining mode.

18 Claims, 4 Drawing Sheets

METHOD AND APPARATUS FOR MANAGING CHARGE DEPLETION IN A PLUG-IN HYBRID VEHICLE

TECHNICAL FIELD

This disclosure is related to control systems for plug-in hybrid vehicles.

BACKGROUND

The statements in this section merely provide background information related to the present disclosure. Accordingly, such statements are not intended to constitute an admission of prior art.

Powertrain architectures for vehicles include hybrid powertrain systems that employ multiple torque-generative devices including internal combustion engines and non-combustion torque machines that transmit mechanical torque either directly or via a transmission device to a driveline for use as tractive torque. Known internal combustion engines can also generate torque which may be transmitted to a torque machine to generate power that is storable as potential energy in an on-board storage device. An on-board storage device can be coupled to a remote power supply for charging during a period when the vehicle is static, e.g., parked. Vehicles configured with an on-board storage device couplable to a remote power supply are often referred to as plug-in hybrids.

Known internal combustion engines include multi-cylinder heat engines that convert stored fuel to mechanical power through combustion processes. Known non-combustion torque machines include multiphase electric motors that transform electric power to mechanical power. An electrical energy storage device, e.g., a battery, stores DC electrical power that can be transferred and converted to AC electric power using an inverter device to operate the multiphase electric machine to generate mechanical power to achieve work. Parameters associated with energy storage devices include a state of charge (SOC) and battery efficiency.

Hybrid powertrain systems can operate in charge-sustaining modes and charge-depletion modes. A hybrid powertrain system operating in a charge-sustaining mode generates mechanical power from an engine and an electric machine to a vehicle driveline responsive to an operator torque request while maintaining an SOC of the energy storage device within a pre-defined window, e.g., within an SOC between 50% to 60% during a trip. Thus, power outputs from the engine and the electric machine are controlled to be responsive to the operator torque request and to opportunistically charge and discharge the energy storage device during each trip.

A hybrid powertrain system operating in a charge-depletion mode generates mechanical power from an engine and an electric machine to a vehicle driveline responsive to an operator torque request and while depleting an SOC of the energy storage device from an initial SOC to a pre-defined minimum SOC during a trip. When the SOC decreases to the pre-defined minimum SOC during a trip, the hybrid powertrain system begins operating in the charge-sustaining mode including operating to maintain the SOC at or near the minimum SOC. Thus, power outputs from the engine and the electric machine are controlled responsive to the operator torque request while discharging the energy storage device during each trip. A hybrid powertrain system operating as a plug-in hybrid system and employing in a charge-depletion mode preferably charges the energy storage device during periods when the vehicle is not operating using available electric power, e.g., from an electric power grid.

SUMMARY

A plug-in hybrid vehicle includes a hybrid powertrain system and an energy storage device. A method for operating the hybrid powertrain system includes initially operating the hybrid powertrain system in a charge-depletion mode to reduce a state-of-charge (SOC) of an energy storage device. In response to an operator request, the hybrid powertrain system operates in an opportunity charging mode to opportunistically charge the energy storage device to increase the SOC of the energy storage device during a trip prior to achieving a minimum SOC that is associated with triggering operation in a charge sustaining mode.

BRIEF DESCRIPTION OF THE DRAWINGS

One or more embodiments will now be described, by way of example, with reference to the accompanying drawings, in which.

DETAILED DESCRIPTION

Figure 1:
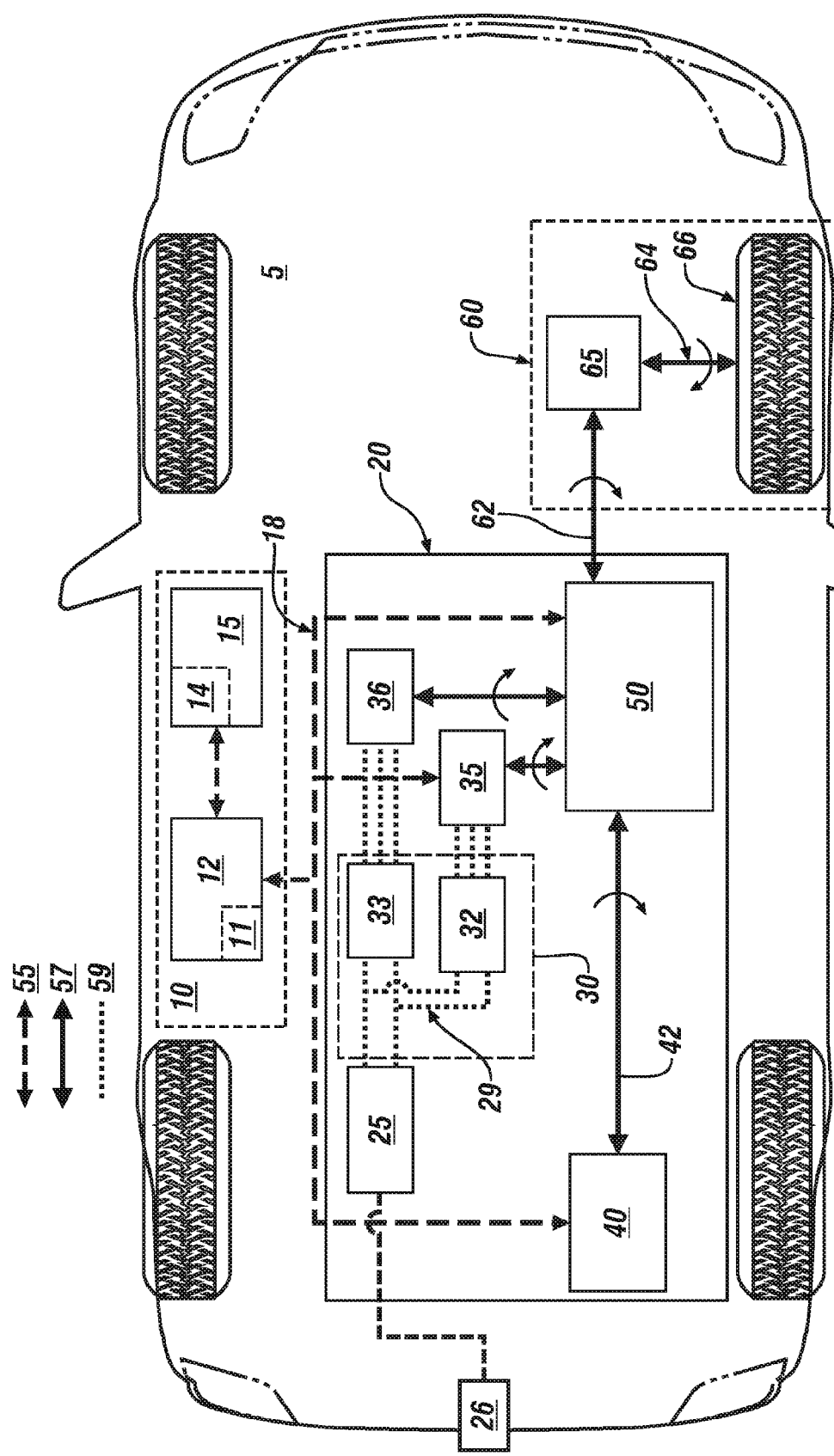
FIG. 1 illustrates a plug-in hybrid vehicle (PHV) including an embodiment of a hybrid powertrain system coupled to a driveline and controlled by a control system, in accordance with the disclosure.

Referring now to the drawings, wherein the showings are for the purpose of illustrating certain exemplary embodiments only and not for the purpose of limiting the same, FIG. 1 schematically illustrates a plug-in hybrid vehicle (PHV) 5 including a hybrid powertrain system 20 coupled to a driveline 60 and controlled by a control system 10. The PHV 5 described herein is configured as a hybrid-electric vehicle employing an internal combustion engine (engine) 40 and first and second electrically-powered torque machines 35 and 36, respectively. The PHV 5 described herein is provided to illustrate the concepts of this disclosure which apply to other hybrid-electric powertrain configurations and other hybrid systems that are configured with a remotely chargeable, non-combustion on-vehicle energy storage system 25, including, e.g., a hybrid-pneumatic vehicle employing an internal combustion engine and pneumatically-powered torque machines, and a hybrid-hydraulic vehicle employing an internal combustion engine and hydraulically-powered torque machines. Like numerals refer to like elements throughout the description. The PHV 5 may be configured to operate in one of an electric vehicle (EV) mode and a hybrid vehicle (HV) mode. Operating the PHV 5 in the EV mode includes generating all tractive torque from one or more of the torque machines 35, 36 driven by electric power. In an all-electric EV mode, the electric power originates from the energy storage system 25, e.g., an on-vehicle electric energy storage system 25 and the engine 40 is in an off state. In a partial-electric EV mode, the electric power originates from the on-vehicle energy storage system 25 in conjunction with electric power from a generator device, e.g., one of the first and second torque machines 35, 36 that is mechanically coupled to and driven by the engine 40. Engine operation may start and stop during operation in the partial-electric EV mode. Operating the PHV 5 in the HV mode includes generating at least some of the tractive torque from the engine 40. A portion of the tractive torque may be generated by one of the first and second torque machines 35, 36. The HV mode may include one or more operating states wherein all the tractive torque is generated by the engine 40.

The hybrid powertrain system 20 employs communications paths 55, mechanical power paths 57, and high-voltage electric power paths 59. The mechanical power paths 57 mechanically couple elements that generate, use, and/or transfer torque, including the engine 40, the first and second torque machines 35, 36, a hybrid transmission 50, and driveline 60. The high-voltage electric power paths 59 electrically connect elements that generate, use, and/or transfer high-voltage electric power, including the energy storage system 25, an inverter module 30, and the first and second torque machines 35, 36. The high-voltage electric power paths 59 include a high-voltage bus 29. The communications path 55 includes high-speed data transfer lines to effect communications between various elements of the PHV 5, and may include one or more of a direct connection, a local area network bus, and a serial peripheral interface bus, and includes a high-speed communications bus 18.

The energy storage system 25 may be any suitable energy storage system. One exemplary energy storage system 25 is a high-voltage battery fabricated from a plurality of lithium-ion cells. It is appreciated that the energy storage system 25 may include a plurality of electrical cells, ultracapacitors, and other suitable devices configured to store electric energy on-vehicle.

The engine 40 is preferably a multi-cylinder direct fuel injection internal combustion engine that converts fuel to mechanical power through a combustion process. The engine 40 is equipped with a plurality of sensing devices and actuators configured to monitor operation and deliver fuel to form a combustion charge to generate torque. In one embodiment, the engine 40 is configured to operate as a spark-ignition engine with timing of combustion and the associated engine torque being controlled by advancing or retarding spark ignition timing. In one embodiment the engine 40 is configured as a spark-ignition direct-injection (SIDI) engine that operates in either a spark-ignition combustion mode or a controlled auto-ignition (HCCI) combustion mode. Alternatively, the engine 40 is configured to operate as a compression-ignition engine with timing of combustion and the associated engine torque controlled by advancing or retarding timing of fuel injection events. The engine 40 is configured to execute autostart and autostop control schemes and fuel cutoff (FCO) control schemes during ongoing operation of the vehicle system 5. The engine 40 is considered to be in an OFF state when it is not being fueled and is not spinning. The engine 40 is considered to be in an FCO state when it is spinning but is not being fueled.

The first and second torque machines 35, 36 preferably include multi-phase electric motor/generators electrically connected to the inverter module 30 that are configured to convert stored electric energy to mechanical power and convert mechanical power to electric energy that may be stored in the energy storage system 25. The first and second torque machines 35, 36 have limitations in power outputs in the form of minimum and maximum torques and rotational speeds.

The inverter module 30 includes first and second inverters 32 and 33 that electrically connect to the first and second torque machines 35, 36, respectively. The first and second torque machines 35, 36 interact with the respective first and second inverters 32 and 33 to convert stored electric energy to mechanical power and convert mechanical power to electric energy that may be stored in the energy storage system 25. The first and second electric power inverters 32 and 33 are operative to transform high-voltage DC electric power to high-voltage AC electric power and also operative to transform high-voltage AC electric power to high-voltage DC electric power. Electric power originating in the first torque machine 35 may be transferred electrically to the energy storage system 25 via the inverter module 30 and the high-voltage bus 29 and to the second torque machine 36 via the inverter module 30. Electric power originating in the second torque machine 36 may be transferred electrically to the energy storage system 25 via the inverter module 30 and the high-voltage bus 29 and to the first torque machine 35 via the inverter module 30 and the high-voltage bus 29.

The hybrid transmission 50 preferably includes one or more differential gear sets and controllable clutch components to effect torque transfer over a range of speeds among the engine 40, the first and second torque machines 35, 36, and an output member 62 that couples to the driveline 60. In one embodiment the hybrid transmission 50 is a two-mode transmission device configurable to transfer torque in one of an input-split mode and a compound-split mode. Mechanical power originating in the engine 40 may be transferred via an input member 42 to the first torque machine 35 and to the output member 62 via the hybrid transmission 50. Mechanical power originating in the first torque machine 35 may be transferred to the engine 40 via the hybrid transmission 50 and the input member 42, and may be transferred to the output member 62 via the hybrid transmission 50. Mechanical power originating in the second torque machine 36 may be transferred via the hybrid transmission 50 to the output member 62. Mechanical power may be transferred between the hybrid transmission 50 and the driveline 60 via the output member 62. Operating parameters associated with mechanical power transfer include power between the engine 40 and the hybrid transmission 50 indicated by input torque Ti and input speed Ni, and power between the hybrid transmission 50 and the driveline 60 indicated by tractive torque To and output speed No. The driveline 60 may include a differential gear device 65 that mechanically couples to an axle 64 or half-shaft that mechanically couples to a ground-engaging wheel 66 in one embodiment. The differential gear device 65 is coupled to the output member 62 of the hybrid powertrain system 20, and transfers output power therebetween. The driveline 60 transfers tractive power between the hybrid transmission 50 and a road surface.

When the energy storage system 25 is a high-voltage battery, it stores potential electric energy and electrically connects via the high-voltage bus 29 to the inverter module 30 that connects to the first and second torque machines 35, 36 to transfer electric power therebetween. An external connector 26 electrically connects to the high-voltage battery 25 and is connectable to an external AC power source to provide electric power for charging the high-voltage battery 25 during vehicle static periods.

Parameters associated with the energy storage system 25 include a state-of-charge (SOC), temperature, available voltage, and available battery power that are preferably monitored by the control system 10. The available battery power is represented by battery power limits that include an allowable range between a minimum and maximum allowable battery power, as represented by a minimum SOC and a maximum SOC. It is appreciated that the battery power is measured in terms of a parameter that may be regularly monitored, e.g., the SOC or another suitable parameter. The allowable battery power limits are preferably established at threshold levels to prevent either overcharging or overdischarging of the energy storage system 25, which may result in damage that reduces service life thereof.

The PHV 5 may employ an electric power management system that includes a charge-depletion mode and a charge-sustaining mode. The terms "charge-depletion" and "charge-sustaining" define and indicate operating modes for using and managing stored electric power in a hybrid vehicle, e.g., the PHV 5 during a trip. By way of definition, a trip includes vehicle operation during a single key-on cycle by an operator. During each trip, the PHV 5 operates in a charge-depletion mode to generate tractive torque exclusively using power from the high-voltage battery 25 through the torque machines 35, 36 until the SOC of the energy storage system 25 is less than a minimum threshold, so long as the first and second torque machines 35, 36 are able to generate sufficient tractive torque to respond to an output torque request. When the SOC of the energy storage system 25 reaches the minimum threshold, the engine 40 can activated to generate torque for either or both tractive torque generation and electric power generation. The PHV 5 operates in the charge-sustaining mode to generate tractive torque using both the engine 40 and the torque machines 35, 36 with the intent of maintaining the SOC of the energy storage system 25 within a predetermined range of the minimum threshold. Magnitudes of threshold states described herein are determined and correspond to system requirements including minimum and maximum thresholds for the SOC of the energy storage system 25. The PHV 5 is also configured to effect opportunity charging of the energy storage device by employing the engine to drive one of the first and second torque machines 35, 36 to generate electric power, preferably when the engine is operating at or near a peak engine operating efficiency. Other forms of electrical charging during ongoing vehicle operation, include by way of example, regenerative braking.

The control system 10 includes a control module 12 that signally connects to an operator interface 15. The control module 12 includes a low-voltage electric power supply to provide regulated electric power thereto. The operator interface 15 includes a plurality of human/machine interface devices through which the vehicle operator commands and controls operation of the PHV 5, including, e.g., an ignition switch to enable an operator to initiate vehicle operation via a key-on event, an accelerator pedal, a brake pedal, a transmission range selector, i.e., PRNDL, cruise control and a charge selector actuator 14. Vehicle operator commands include an operator torque request, which indicates an operator request for a magnitude of tractive torque delivered to the driveline 60 to effect vehicle acceleration. Vehicle acceleration includes positive and negative acceleration events. The charge selector actuator 14 can be in the form of a switch or another suitable device through which the vehicle operator indicates a preferred powertrain operating mode. The preferred powertrain operating modes preferably include selection of a charge-depletion mode that includes operating in an EV mode, and a charge-sustaining mode that includes operating with one of a HOLD SOC strategy and a HOLD+SOC strategy that includes operating the hybrid powertrain system to opportunistically charge the energy storage device to increase the SOC of the energy storage device.

Although the control module 12 and operator interface 14 are shown as individual discrete elements, such an illustration is for ease of description. It is appreciated that the functions described as being performed by the control module 12 may be combined into one or more devices, e.g., implemented in software, hardware, and/or application-specific integrated circuitry (ASIC) and ancillary circuits that are separate and distinct from the control module 12. It is appreciated that information transfer to and from the control module 12 may be accomplished using the communications paths 55, including, e.g., communications bus 18. The control module 12 preferably signally and operatively connects to individual elements of the hybrid powertrain system 20 via the communications bus 18. The control module 12 signally connects to the sensing devices of each of the energy storage system 25, the inverter module 30, the first and second torque machines 35, 36, the engine 40, and the hybrid transmission 50 to monitor operation and determine parameters thereof.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Monitored parameters of the engine 40 preferably include engine speed, engine torque or load, and temperature, including the input torque Ti and input speed Ni. Monitored parameters of the hybrid transmission 50 preferably include rotational speeds, including the tractive torque To and output speed No, and hydraulic pressure at a plurality of locations, from which parameters including application of specific torque transfer clutches may be determined Monitored parameters of the first and second torque machines 35, 36 preferably include rotational speeds and power flows, e.g., electric current flow, from which motor torques may be determined Monitored parameters of the energy storage system 25 may include battery power, SOC, and battery temperature in one embodiment.

The control module 12 operatively connects to the actuators of the inverter module 30 including the first and second inverters 32 and 33, the engine 40, and the hybrid transmission 50 to control operation thereof in accordance with executed control schemes that are stored in the form of routines and calibrations. It is appreciated that each of the first and second inverters 32 and 33 transforms electric power in a manner suitable for generating torque with one or both the first and second torque machines 35, 36, and transforms mechanical power in a manner suitable for generating electric power with one or both the first and second torque machines 35, 36, depending upon torque inputs and operating conditions.

The control module 12 executes control schemes 11 to control operation of the engine 40 in coordination with the first and second torque machines 35, 36 to manage transfer of mechanical power to the driveline 60 in response to the operator torque request concurrent with controlling operation of the inverter module 30 to manage electric power flow. Such control schemes include balancing operation of the engine 40 with allowable power limits associated with the energy storage system 25. This includes controlling operation of the engine 40 to achieve a preferred engine speed/load operating point that achieves a peak or otherwise preferred efficiency.

Figure 2:
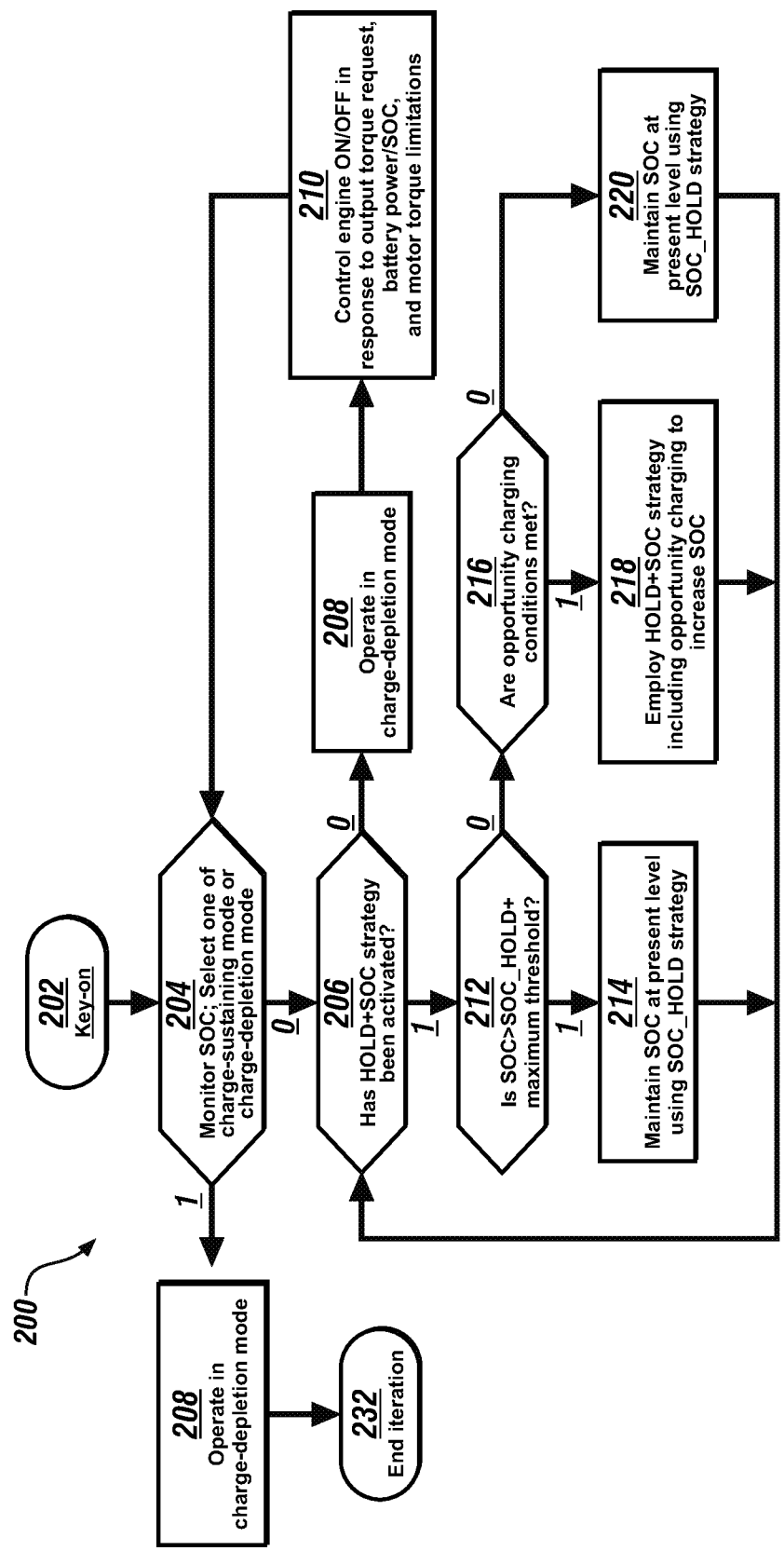
FIG. 2 illustrates a charge management control scheme for controlling operation of a PHV, in accordance with the disclosure.

FIG. 2 illustrates a charge management control scheme 200 for controlling operation of a PHV, e.g., the PHV 5 described with reference to FIG. 1. Table 1 is provided as a key to FIG. 2 wherein the numerically labeled blocks and the corresponding functions are set forth as follows.

TABLE 1

| BLOCK | BLOCK CONTENTS |
| --- | --- |
| 202 | Key-on |
| 204 | Monitor SOC |
|  | Select one of charge-sustaining mode or charge-depletion mode |
| 206 | Has HOLD+ SOC strategy been activated? |
| 208 | Operate in charge-depletion mode |
| 210 | Control engine ON/OFF in response to output torque request, battery power/SOC, and motor torque limitations |
| 212 | Is SOC > SOC_HOLD+ maximum threshold? |
| 214 | Maintain SOC at present level using SOC_HOLD strategy |
| 216 | Are opportunity charging conditions met? |
| 218 | Employ HOLD+ SOC strategy including opportunity charging to increase SOC |
| 220 | Maintain SOC at present level using SOC_HOLD strategy |
| 230 | Operate in charge-sustaining mode to maintain SOC |

The charge management control scheme 200 initiates operation with vehicle key-on (202). Initially, the PHV preferably operates in the all-electric EV mode including the charge-depletion mode when the battery has been fully charged using a remote power supply during an immediately preceding key-off period. Battery power parameters are regularly monitored, including those from which the SOC may be determined. One of a charge-sustaining mode and a charge-depletion mode is selected based upon the SOC. In one embodiment, the charge-sustaining mode is selected only when the SOC decreases to a minimum SOC threshold, thus triggering operation of the powertrain system in the charge-sustaining mode including engine operation to sustain the battery SOC at or greater than the minimum SOC threshold (204). When the PHV is operating in the charge-sustaining mode (204)(1), the PHV continues operating in the charge-sustaining mode (230) and execution of this iteration of the charge management control scheme 200 ends (232).

When the PHV operates in the charge-depletion mode (204)(0), it is determined whether operation in a HOLD+ SOC strategy has been activated by the vehicle operator (206). When operation in the HOLD+SOC strategy has been not activated by the vehicle operator (206)(0), the PHV operates in the charge depletion mode (208), wherein the engine selectively operates in response to vehicle operating parameters including an output torque request, a present battery power, and output torque limitations of the first and second electrically-powered torque machines 35, 36 (210). Execution of this iteration of the charge management control scheme 200 ends.

When the HOLD+SOC strategy has been activated by the vehicle operator (206)(1), it is determined whether the SOC is greater than a HOLD+SOC maximum threshold (212). The HOLD+SOC maximum threshold has a calibratable magnitude that can range between the minimum SOC threshold associated with the charge-sustaining mode and a charge termination SOC associated with maximum SOC charge. The HOLD+SOC maximum threshold is an SOC of 65% in one embodiment. When the SOC is greater than the HOLD+SOC maximum threshold (212)(1), the PHV preferably operates to maintain the SOC at its present level using a HOLD SOC strategy (214). When the SOC is less than the HOLD+SOC threshold (212)(0), it is determined whether conditions for opportunity charging have been met (216). If conditions for opportunity charging have not been met (216)(0), the PHV operates to maintain the SOC at its present level using the HOLD SOC strategy (220). If conditions for opportunity charging have been met (216)(1), the PHV employs the HOLD+SOC strategy to opportunistically charge the battery to increase SOC to the HOLD+SOC threshold (218). Alternatively, the charge management control scheme 200 may operate to permit SOC to fully deplete to the minimum SOC threshold associated with the charge-sustaining mode before permitting operation of the HOLD+ SOC strategy to opportunistically charge the battery to increase SOC to the HOLD+SOC threshold. The HOLD+ SOC strategy includes operating the PHV in either the charge depletion mode or the charge-sustaining mode with allowance for opportunity charging when conditions are met. Stored energy can then be used later on in a drive cycle to re-enable operation in the charge-depletion mode and permit operation in the all-electric EV mode.

Figure 3:
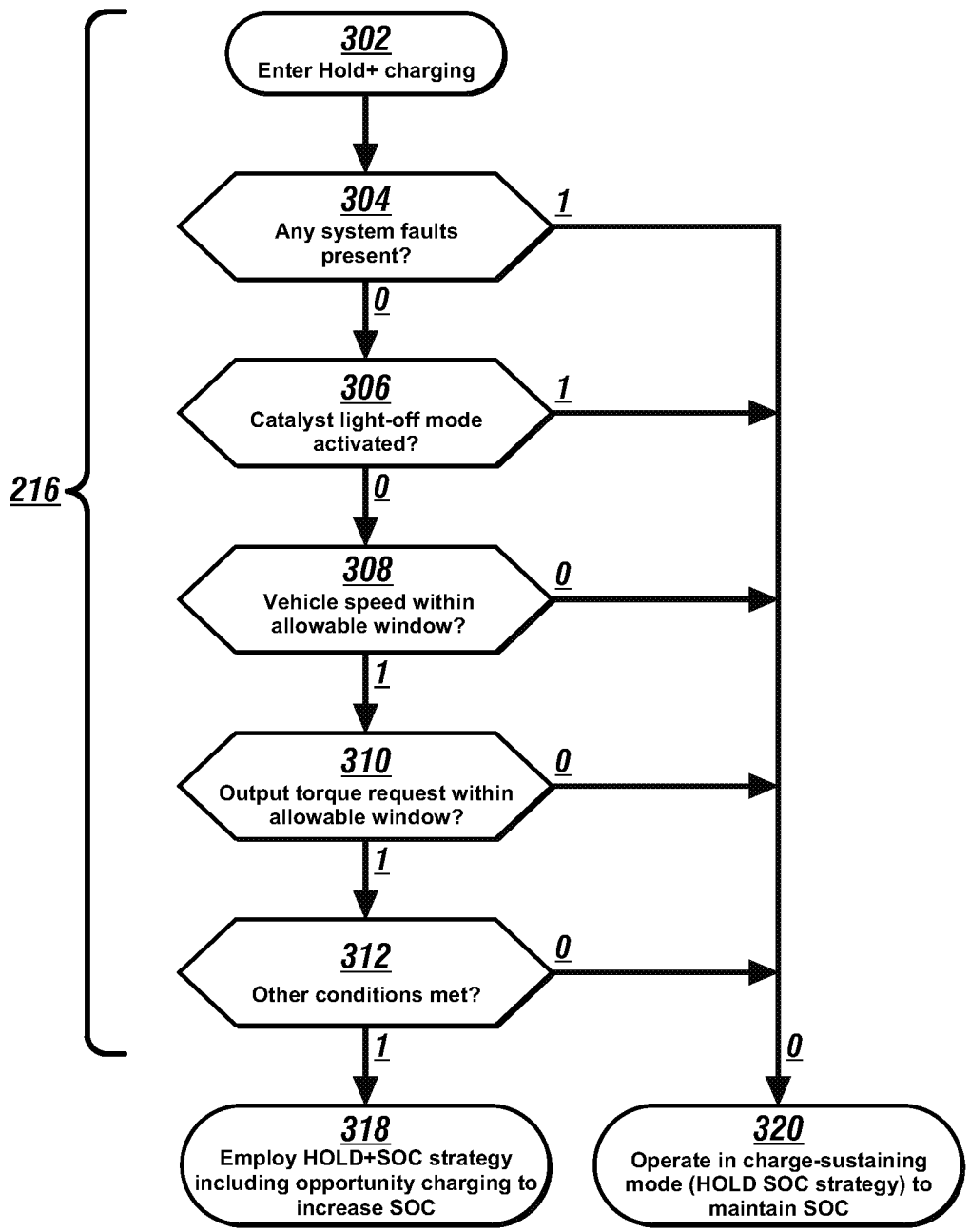
FIG. 3 shows a process for enabling a HOLD+SOC strategy, which includes determining whether the conditions to employ the HOLD+SOC strategy including opportunity charging to increase the SOC are met, in accordance with the disclosure.

FIG. 3 illustrates a process 300 for enabling the HOLD+ SOC strategy, which includes determining whether the conditions to employ the HOLD+SOC strategy including opportunity charging to increase the SOC are met. The process 300 can be employed as an embodiment of block 216 of the charge management control scheme 200. Table 2 is provided as a key to FIG. 3 wherein the numerically labeled blocks and the corresponding functions are set forth as follows.

TABLE 2

| BLOCK | BLOCK CONTENTS |
| --- | --- |
| 302 | Enter Hold+ charging |
| 304 | Any system faults present? |
| 306 | Catalyst light-off mode activated? |
| 308 | Vehicle speed within allowable window? |
| 310 | Output torque request within allowable window? |
| 312 | Other conditions met? |
| 318 | Employ HOLD+ SOC strategy including opportunity charging to increase SOC |
| 320 | Operate in charge-sustaining mode (HOLD SOC strategy) to maintain SOC |

When the HOLD+SOC strategy has been activated, e.g., as described with reference to FIG. 2 (302), it is determined whether the conditions for opportunity charging have been met by evaluating a plurality of vehicle and powertrain operating conditions. As shown, the operating conditions are evaluated serially. It is appreciated that the operating conditions can be coincidentally evaluated or in any selected order without limitation. The operating conditions selected for evaluating opportunity charging are related to determining whether the engine is operating at or near a peak efficiency level and whether any engine or vehicle faults preclude opportunity charging.

The operating conditions include determining whether any system faults, e.g., on-board diagnostic (OBD) faults, have been identified (304) that preclude opportunity charging. By way of example, faults that preclude opportunity charging include excess temperature of the high-voltage battery, high-voltage battery current sensing fault, high-voltage battery capacitance check fault, and any fault that activates an on-vehicle malfunction indicator lamp (MIL). If OBD faults are present (304)(1), the PHV operates to maintain the SOC at its present level using the HOLD SOC strategy (320). If OBD faults are not present (304)(0), opportunity charging is not disabled by this operating condition.

The operating conditions include determining whether the engine is operating in a catalyst light-off mode (306). This precludes avoiding operating the engine for battery charging coincident with operating the engine to effect catalyst light-off. If the engine is operating in a catalyst light-off mode (306)(1), the PHV operates to maintain the SOC at its present level using the HOLD SOC strategy (320). If the engine is not operating in a catalyst light-off mode (306)(0), opportunity charging is not disabled by this operating condition.

The operating conditions include determining whether vehicle speed is within an allowable speed window, i.e., greater than a minimum speed, e.g., associated with idle and low speed operation but less than a maximum speed, e.g., associated with high-speed operation (308). This precludes avoiding operating the engine for battery charging during vehicle operating conditions that include low vehicle speed/stopping, e.g., as occurs in stop/go traffic situations. If the vehicle speed is not within an allowable speed window (308)(0), the PHV operates to maintain the SOC at its present level using the HOLD SOC strategy (320). If the vehicle speed is within an allowable speed window (308)(1), opportunity charging is not disabled by this operating condition.

The operating conditions include determining whether an axle torque request, i.e., an output torque request from the vehicle operator, is within a predetermined calibratable window (310). This avoids operating the engine for battery charging during vehicle operating conditions wherein the powertrain system is unable achieve an output torque request. If the axle torque request is not within a predetermined calibratable window (310)(0), the PHV operates to maintain the SOC at its present level using the HOLD SOC strategy (320). If the axle torque request is within a predetermined calibratable window (310)(1), opportunity charging is not disabled by this operating condition.

The operating conditions include determining whether other conditions have been met (312). Such conditions may include avoiding vehicle operating conditions at operating points that negatively affect driveability or NVH. Such conditions may include permitting vehicle operation employing the HOLD+SOC strategy only when SOC is below a preset threshold. If such conditions have not been met (312)(0), the PHV operates to maintain the SOC at its present level using the HOLD SOC strategy (320). If such conditions have been met (312)(1), opportunity charging is not disabled by this operating condition.

The HOLD+SOC strategy is employed and opportunity charging is enabled when the all the aforementioned conditions are met (318). The process 300 for enabling the HOLD+SOC strategy is preferably iteratively executed during operation, with a determination made each iteration to either employ the HOLD+SOC strategy to opportunistically increase battery SOC or employ the HOLD SOC strategy to maintain battery SOC at its present level.

Figure 4:
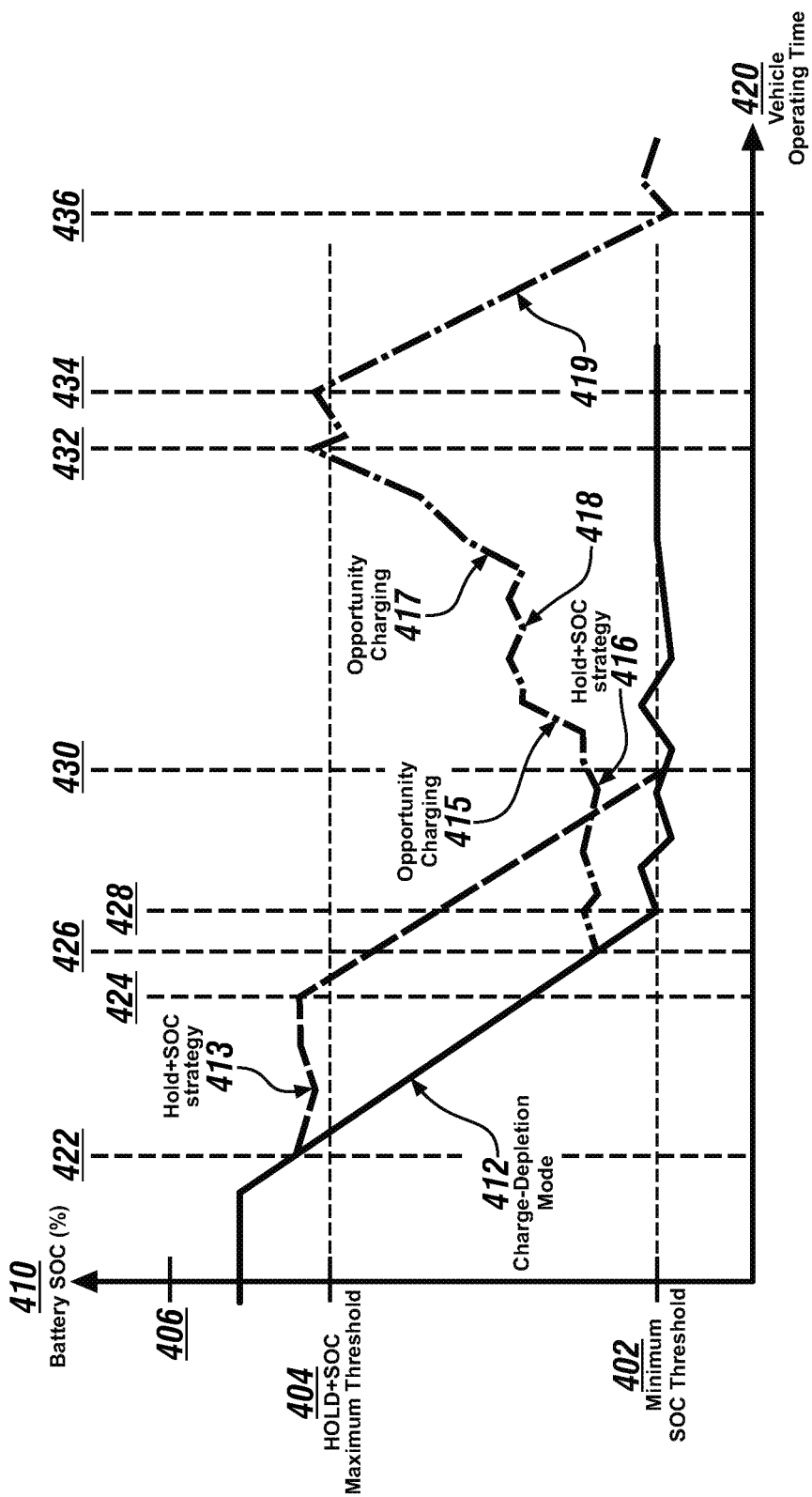
FIG. 4 illustrates a plurality of battery discharge curves for a PHV operating in accordance with the charge management control scheme of FIGS. 2 and 3, in accordance with the disclosure.

FIG. 4 graphically shows a plurality of battery discharge curves for an embodiment of the PHV 5 operating in accordance with the charge management control scheme 200 described with reference to FIGS. 2 and 3. Battery SOC is on the vertical axis (410) having a maximum value 406 of 100% shown in relation to vehicle operating time on the horizontal axis (420). Battery SOC is an example of a suitable battery parameter. Other battery parameters may be employed with similar effect.

Line 412 shows SOC in relation to operating time with the PHV operating in the charge-depletion mode. As shown, the PHV operates in the charge-depletion mode until the SOC decreases to a minimum SOC threshold as shown at line 402, thus triggering operation in the charge-sustaining mode beginning at time 428 and including engine operation to sustain the battery SOC greater than the minimum SOC threshold.

In one operating scenario, the operator may command operation in the HOLD+SOC strategy with the SOC greater than a HOLD+SOC maximum threshold, which is depicted at line 404. Such operation is shown with reference to line 413 beginning at time 422. When the SOC is greater than the HOLD+SOC maximum threshold, the PHV operates to maintain the SOC at its present level using the HOLD SOC strategy. The command to operate using the HOLD+SOC strategy may be subsequently withdrawn, as shown at time 424, thus triggering operation in the charge-depletion mode until the SOC decreases to the minimum SOC threshold shown at line 402, triggering subsequent operation in the charge-sustaining mode beginning at time 430.

In one operating scenario, the operator may command operation in the HOLD+SOC strategy with the SOC less than the HOLD+SOC maximum threshold depicted at line 404, which is preferably preset, and may be an operator-selectable magnitude. One such operation is shown beginning at time 426. When the SOC is greater than the HOLD+SOC maximum threshold, the PHV will not employ the HOLD+SOC strategy. When the SOC is less than the HOLD+SOC maximum threshold, the PHV operates to maintain the SOC at its present level and employs the HOLD+SOC strategy to opportunistically charge the battery to increase SOC to the HOLD+SOC threshold when conditions for opportunity charging have been met, as shown with reference to line 416. Line segments 415 and 417 indicate periods of operation when opportunity charging is occurring. Line segment 418 indicates another period of operation when the SOC is maintained at its present level. At time 432, the SOC increases to the HOLD+SOC maximum threshold (line 404), at which time the HOLD+SOC strategy deactivates and the PHV operates in the charge-sustaining mode. At time 434, the operator deactivates the HOLD+SOC strategy. Subsequently, the PHV operates in the charge-depletion mode, shown at line segment 419, until the SOC decreases to the minimum SOC threshold shown at line 402, triggering subsequent operation in the charge-sustaining mode beginning at time 436.

The HOLD+SOC strategy described herein may be advantageously employed by a vehicle operator that uses a drive schedule that exceeds the EV range capability of the vehicle wherein city driving occurs at the end of a trip. In such circumstances there can be an acceptable EV experience at the beginning of a trip with a full battery charge and at the end of a trip with EV driving and subsequent vehicle plug in, and without compromising fuel economy or drive quality over the trip.

The HOLD+SOC strategy includes operating in a charge depletion mode with allowance for opportunity charging when conditions are met. This includes operating in the charge depletion mode with allowance for opportunity charging once the battery has been initially depleted below a maximum threshold. Stored energy can then be used later on in a drive cycle to re-enable operation in the charge-depletion mode and permit operation in the all-electric EV mode. This allows the vehicle operator to select when to use the battery charge and provides an opportunity for multiple charge depletions on a long distance drive. Such operation can enable equivalent fuel economy and increased electric range for vehicle operators who may be unable to avail themselves of a stationary electric charging system.

The HOLD+SOC strategy has been shown to achieve the same fuel economy and total trip energy cost as a system employing only a charge-depletion mode operated in series with a charge-sustaining mode while permitting additional operating time in the all-electric EV mode during the trip.

The HOLD+SOC strategy increases a vehicle operator's ability to fully deplete the battery during a trip and then charge the battery for use in a low emissions zone at the end of a trip. Such operation can be employed in a situation wherein a planned trip exceeds the EV range capability of the vehicle and the trip includes city driving towards the end of the trip without compromising fuel economy or drive quality over the trip.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating a hybrid powertrain system in a plug-in hybrid vehicle, comprising:
   initially operating the hybrid powertrain system in a charge-depletion mode to reduce a state-of-charge (SOC) of an energy storage device;
   monitoring the SOC of the energy storage device;
   operating the hybrid powertrain system in a charge-sustaining mode only when the SOC of the energy storage device decreases to a predetermined minimum SOC threshold, the charge-sustaining mode including operating an internal combustion engine and an electric machine of the hybrid powertrain system to sustain the SOC of the energy storage device at or above the predetermined minimum SOC threshold;
   operating the hybrid powertrain system in the charge-depletion mode when the monitored SOC of the energy storage device is greater than the predetermined minimum SOC threshold;
   in response to an operator request for a HOLD+SOC strategy, determining if the SOC of the energy storage device is less than a predetermined HOLD+SOC maximum threshold associated with operating the hybrid powertrain system in an opportunity charging mode;
   if the SOC of the energy storage device is greater than the predetermined HOLD+SOC maximum threshold operating the hybrid powertrain system to maintain the SOC of the energy storage device;
   if the SOC of the energy storage device is less than the predetermined HOLD+SOC maximum threshold, iteratively determining whether operating conditions for operating the hybrid powertrain system in the opportunity charging mode have been met, said operating conditions having been met when an internal combustion engine of the hybrid powertrain system is operating at a desired efficiency and no operating faults are present;
   operating the hybrid powertrain system in an opportunity charging mode, comprising operating the internal combustion engine to generate torque to charge the energy storage device, only when the SOC of the energy storage device is less than a predetermined maximum SOC threshold and operating conditions for operating the hybrid powertrain system in the opportunity charging mode have been met, and charging the energy storage device to increase the SOC of the energy storage device up to the predetermined HOLD+SOC maximum threshold during a trip prior to the SOC of the energy storage device achieving the predetermined minimum SOC threshold that is associated with triggering operation of the hybrid powertrain system in the charge-sustaining mode; and
   operating the hybrid powertrain system to maintain the SOC of the energy storage device when the SOC of the energy storage device is less than the predetermined maximum SOC threshold, but operating conditions for operating the hybrid powertrain system in the opportunity charging mode have not been met; and
   continuing operating the hybrid powertrain system to maintain the SOC of the energy storage device when operating conditions for operating the hybrid powertrain system in an opportunity charging mode have not been met, and to opportunistically charge the energy storage device when operating conditions for operating the hybrid powertrain system in an opportunity charging mode have been met, until the SOC of the energy storage device has increased to the predetermined HOLD+SOC maximum threshold.

2. The method of claim 1, further comprising operating the hybrid powertrain system to maintain the SOC of the energy storage device at an operator-selected SOC level greater than said predetermined minimum SOC in response to said operator request.

3. The method of claim 2, wherein operating the hybrid powertrain system to maintain the SOC of the energy storage device at the operator-selected SOC level greater than said predetermined minimum SOC in response to the operator request comprises operating the hybrid powertrain system in a partial-electric electric vehicle (EV) mode.

4. The method of claim 1, wherein operating the hybrid powertrain system in the opportunity charging mode comprises operating the hybrid powertrain system to charge the energy storage device only when the SOC is less than a maximum threshold.

5. The method of claim 4, further comprising operating the hybrid powertrain system in a charge sustaining mode when the SOC achieves the maximum threshold subsequent to operating the hybrid powertrain in the opportunity charging mode.

6. The method of claim 1, wherein operating the hybrid powertrain system in the opportunity charging mode comprises operating the hybrid powertrain system to charge the energy storage device only when no diagnostic faults are present.

7. The method of claim 1, wherein operating the hybrid powertrain system in the opportunity charging mode comprises operating the hybrid powertrain system to charge the energy storage device only when vehicle speed is within an allowable window.

8. The method of claim 1, wherein operating the hybrid powertrain system in the opportunity charging mode comprises operating the hybrid powertrain system to charge the energy storage device only when an output torque request is within an allowable window.

9. The method of claim 1, wherein operating the hybrid powertrain system in the opportunity charging mode comprises operating the hybrid powertrain system to charge the energy storage device only when the internal combustion engine is not operating in a catalyst light-off mode.

10. The method of claim 1, wherein operating the hybrid powertrain system in the charge-depletion mode comprises operating the hybrid powertrain system in an all-electric electric vehicle mode.

11. The method of claim 1, wherein operating the hybrid powertrain system in the charge-depletion mode comprises operating the powertrain system in one of an all-electric electric vehicle mode and a partial electric electric vehicle mode.

12. The method of claim 1, further comprising operating the hybrid powertrain system in the charge-depletion mode in response to a second operator request subsequent to operating the hybrid powertrain system in the opportunity charging mode.

13. A method for operating a plug-in hybrid vehicle to generate tractive torque, comprising:
monitoring a state-of-charge (SOC) of an energy storage device;
operating the hybrid vehicle in a charge-sustaining mode only when the SOC of the energy storage device decreases to a predetermined minimum SOC threshold, the charge-sustaining mode including operating an internal combustion engine and an electric machine of the hybrid powertrain system to sustain the SOC of the energy storage device at or above the predetermined minimum SOC threshold;
operating the hybrid powertrain system in the charge-depletion mode when the monitored SOC of the energy storage device is greater than the predetermined minimum SOC threshold;
in response to an operator command for a HOLD+SOC strategy, discontinuing operation in a charge-depletion model, determining if the SOC of the energy storage device is less than a predetermined HOLD+SOC maximum threshold associated with operating the hybrid powertrain system in an opportunity charging mode;
if the SOC of the energy storage device is greater than the predetermined HOLD+SOC maximum threshold operating the hybrid vehicle to maintain the SOC of the energy storage device;
if the SOC of the energy storage device is less than the predetermined HOLD+SOC maximum threshold, iteratively determining whether operating conditions for operating an engine in the opportunity charging mode, comprising operating the engine to generate torque to charge the energy storage device, have been met, said operating conditions having been met when the engine system is operating at a desired efficiency and no operating faults are present;
operating the engine to maintain SOC of the energy storage device greater than an operator selected level when the SOC of the energy storage device is less than the predetermined maximum SOC threshold, but operating conditions for operating the hybrid powertrain system in the opportunity charging mode have not been met;
operating the engine to effect opportunity charging of the energy storage device only when the SOC of the energy storage device is less than a predetermined maximum SOC threshold and operating conditions for operating the hybrid powertrain system in the opportunity charging mode have been met, and charging the energy storage device to increase the SOC of the energy storage device up to the predetermined HOLD+SOC maximum threshold during a trip prior to the SOC of the energy storage device achieving the predetermined minimum SOC threshold that is associated with triggering operation of the hybrid powertrain system in the charge sustaining mode; and
continuing operating the hybrid powertrain system to maintain the SOC of the energy storage device when conditions for operating the hybrid powertrain system in an opportunity charging mode have not been met, and to opportunistically charge the energy storage device when conditions for operating the hybrid powertrain system in an opportunity charging mode have been met, until the SOC of the energy storage device has increased to the predetermined maximum SOC.

14. The method of claim 13, further comprising:
in response to a second operator request, operating in the charge-depletion mode subsequent to operating the hybrid powertrain system to opportunistically charge the energy storage device.

15. The method of claim 13, further comprising discontinuing operating the engine to effect opportunity charging of the energy storage device when the SOC of the energy storage device achieves a maximum SOC threshold.

16. The method of claim 15, further comprising operating in a charge sustaining mode when the SOC achieves the maximum threshold subsequent to operating the engine to effect opportunity charging.

17. The method of claim 13, wherein operating the engine to effect opportunity charging of the energy storage device is only effected when the engine is operating at or near peak engine operating efficiency and when no diagnostic faults are present.

18. The method of claim 13, wherein operating the engine to effect opportunity charging of the energy storage device is only effected when the engine is operating at or near peak engine operating efficiency, when no diagnostic faults are present, and when the engine is not operating in a catalyst light-off mode.

* * * * *